United States Patent
Ishii et al.

(10) Patent No.: US 9,886,399 B2
(45) Date of Patent: Feb. 6, 2018

(54) STORAGE CONTROL DEVICE, STORAGE DEVICE, INFORMATION PROCESSING SYSTEM, AND STORAGE CONTROL METHOD THEREFOR

(71) Applicant: Sony Corporation, Tokyo (JP)

(72) Inventors: Ken Ishii, Tokyo (JP); Keiichi Tsutsui, Kanagawa (JP); Ryoji Ikegaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 379 days.

(21) Appl. No.: 14/528,586

(22) Filed: Oct. 30, 2014

(65) Prior Publication Data

US 2015/0154125 A1    Jun. 4, 2015

(30) Foreign Application Priority Data

Dec. 2, 2013   (JP) ................................ 2013-248860

(51) Int. Cl.
| | |
|---|---|
| *G11C 29/00* | (2006.01) |
| *G06F 12/14* | (2006.01) |
| *G06F 12/0871* | (2016.01) |
| *G06F 11/10* | (2006.01) |

(52) U.S. Cl.
CPC ...... *G06F 12/1491* (2013.01); *G06F 11/1048* (2013.01); *G06F 12/0871* (2013.01); *G06F 2212/222* (2013.01); *G06F 2212/403* (2013.01); *G06F 2212/6046* (2013.01)

(58) Field of Classification Search
CPC ............ G06F 11/1048; G06F 12/1491; G06F 2212/222; G06F 2212/403; G06F 2212/6046; G06F 12/0871
See application file for complete search history.

(56) References Cited

U.S. PATENT DOCUMENTS

| | | | | |
|---|---|---|---|---|
| 4,686,621 A | * | 8/1987 | Keeley | ............... G06F 12/0864 711/E12.018 |
| 4,945,512 A | * | 7/1990 | DeKarske | ........... G06F 11/1064 365/230.03 |
| 4,953,164 A | * | 8/1990 | Asakura | .............. G06F 11/1064 714/754 |
| 2007/0174550 A1 | * | 7/2007 | Maeda | .................. G06F 3/0608 711/118 |
| 2008/0046639 A1 | * | 2/2008 | Tsuji | ................... G06F 12/0207 711/103 |

(Continued)

FOREIGN PATENT DOCUMENTS

JP         2012-038245          2/2012

*Primary Examiner* — Guy Lamarre
(74) *Attorney, Agent, or Firm* — Michael Best & Friedrich LLP

(57) ABSTRACT

Data are stored using a writing method according to the property of the data in a storage device. An area defining unit defines, in a second memory, a system area for storing system information causing a system to operate and a cache area temporarily storing data of a first memory. A moving processing unit moves data stored in the cache area to the first memory at a predetermined point in time. An access control unit accesses the second memory in accordance with the definition with regard to access corresponding to the system area or the cache area, and read data from the first memory with regard to read-access corresponding to those other than the system area and the cache area.

13 Claims, 15 Drawing Sheets

(56) References Cited

U.S. PATENT DOCUMENTS

| | | | | |
|---|---|---|---|---|
| 2008/0301365 | A1* | 12/2008 | Matsushige | G06F 3/061 |
| | | | | 711/113 |
| 2009/0072858 | A1* | 3/2009 | D'Souza | H03K 19/177 |
| | | | | 326/47 |
| 2010/0103549 | A1* | 4/2010 | Murayama | G06F 3/0613 |
| | | | | 360/15 |
| 2013/0246690 | A1* | 9/2013 | Haneda | G06F 12/0246 |
| | | | | 711/103 |
| 2014/0297964 | A1* | 10/2014 | Nakase | G06F 12/1054 |
| | | | | 711/136 |
| 2015/0074336 | A1* | 3/2015 | Nemoto | G06F 3/0619 |
| | | | | 711/103 |

\* cited by examiner

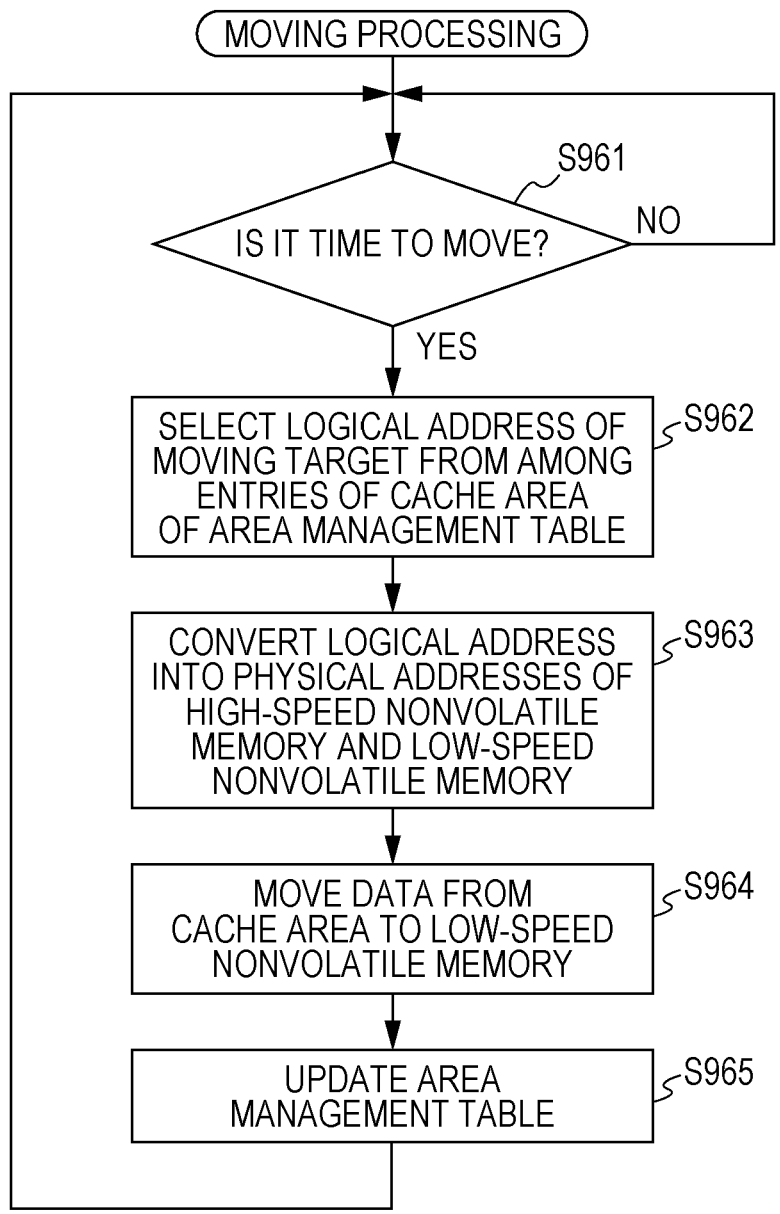

STORAGE CONTROL DEVICE, STORAGE DEVICE, INFORMATION PROCESSING SYSTEM, AND STORAGE CONTROL METHOD THEREFOR

CROSS REFERENCE TO RELATED APPLICATIONS

This application claims the benefit of Japanese Priority Patent Application JP 2013-248860 filed on Dec. 2, 2013, the entire contents of which are incorporated herein by reference.

TECHNICAL FIELD

The present technique relates to a storage control device. More particularly, the present technique relates to a storage control device, a storage device, an information processing system, and a processing method therefor for a memory using some of nonvolatile memories as a cache for a different nonvolatile memory in a memory system including multiple nonvolatile memories, and also relates to a program for causing a computer to execute the method.

BACKGROUND ART

A SSD (Solid State Drive) is used as a storage device using a semiconductor memory instead of a disk drive using a hard disk in the related art. In an SSD, a NAND-type flash memory is often used, but there is a problem in that, when data are erased from the NAND-type flash memory, data are erased in a unit of block constituted by multiple pages, and therefore, it takes some time to rewrite the page unit. Therefore, a data storage device having a flash memory and a resistance random access memory has been suggested (for example, see PTL 1). In this data storage device, writing data are once written to a resistance random access memory, and every time one page of data and error correction symbols are stored, control is performed to store the symbolized data to a flash memory.

CITATION LIST

Patent Literature

[PTL 1]
JP 2012-038245 A

SUMMARY

Technical Problem

In the above technique in the related art, writing data are once written to the resistance random access memory, and therefore, writing data can be input in order without waiting for the processing for controlling the flash memory. However, in this technique in the related art, data are typically read from a flash memory, and therefore it is difficult to increase the reading time.

The present technique is made in view of such circumstances, and it is desired to store data using a writing method according to the property of the data in a storage device.

Solution to Problem

According to an embodiment of the present technique, there is provided a storage control device and a storage control method therefor including an area defining unit configured to define, in a second memory, a system area for storing system information causing a system to operate and a cache area temporarily storing data of a first memory, a moving processing unit configured to move data stored in the cache area to the first memory at a predetermined point in time, and an access control unit configured to access the second memory in accordance with the definition with regard to access corresponding to the system area or the cache area, and read data from the first memory with regard to read-access corresponding to those other than the system area and the cache area. Therefore, there is an advantage in that the second memory having the system area and the cache area is accessed according to the property of data.

In this embodiment, the access control unit may access the data in accordance with a data access size individually defined for each of the system area and the cache area. Therefore, there is an advantage in that the data are accessed with the data size according to the property of the data.

In this embodiment, the data access size of the system area may be larger than the data access size of the cache area. This is in view of the fact that large-sized data are often read continuously in the system area.

In this embodiment, the storage control device may further includes an error detection correction processing unit performing error detection correction processing by giving an error correction code to a unit of data having a size defined individually for each of the system area and the cache area. Therefore, there is an advantage in that the error correction code is given in the unit suitable for the system area and the cache area. In this case, the data size of the giving unit of the error correction code for the system area may be more than the data size of the giving unit of the error correction code for the cache area. This is in view of the fact that a high degree of reliability is demanded in the system area.

In this embodiment, the access control unit may configure such that a pulse width for writing to the system area is longer than that for the cache area, or a voltage for writing to the system area is more than that for the cache area. Alternatively, the access control unit may configure such that a verification threshold value for writing to the system area is stricter than that for the cache area. This is in view of the fact that a high degree of reliability is demanded in the system area.

In this embodiment, the access control unit may configure such that the number of times verification is performed during writing to the cache area is less than that for the system area. This is in view of the fact that a high speed access is demanded in the cache area.

According to another embodiment of the present technique, there is provided a storage device including a first memory, a second memory, an area defining unit configured to define, in the second memory, a system area for storing system information causing a system to operate and a cache area temporarily storing data of the first memory, a moving processing unit configured to move data stored in the cache area to the first memory at a predetermined point in time, and an access control unit configured to access the second memory in accordance with the definition with regard to access corresponding to the system area or the cache area, and read data from the first memory with regard to read-access corresponding to those other than the system area and the cache area. Therefore, the second memory is provided with the system area and the cache area, and there is an advantage in that the data are accessed according to the property of the data. In this case, the first and second memories may be nonvolatile memories, and a reading processing time of the second memory may be less than a reading processing time of the first memory.

According to another embodiment of the present technique, there is provided an information processing system including a first memory, a second memory, an area defining unit configured to define, in the second memory, a system area for storing system information causing a system to operate and a cache area temporarily storing data of the first memory, a moving processing unit configured to move data stored in the cache area to the first memory at a predetermined point in time, an access control unit configured to access the second memory in accordance with the definition with regard to access corresponding to the system area or the cache area, and read data from the first memory with regard to read-access corresponding to those other than the system area and the cache area, and a host computer configured to issue an access request to the access control unit for access to the first or second memory. Therefore, the second memory is provided with the system area and the cache area, and there is an advantage in that the data are accessed by the host computer according to the property of the data.

Advantageous Effects of Invention

The present technique has a superior effect in that data can be stored using a writing method according to the property of the data in a storage device.

BRIEF DESCRIPTION OF DRAWINGS

FIG. 15 is a flow diagram illustrating an example of processing procedure of moving processing of the memory controller 200 according to an embodiment of the present technique.

DESCRIPTION OF EMBODIMENTS

Hereinafter, modes for carrying out the present technique (hereinafter referred to as embodiments) will be explained. The explanation will be given in the following order.
1. Configuration of embodiment
2. Operation of embodiment
<1. Configuration of Embodiment>
[Overview of Information Processing System]

Figure 1:
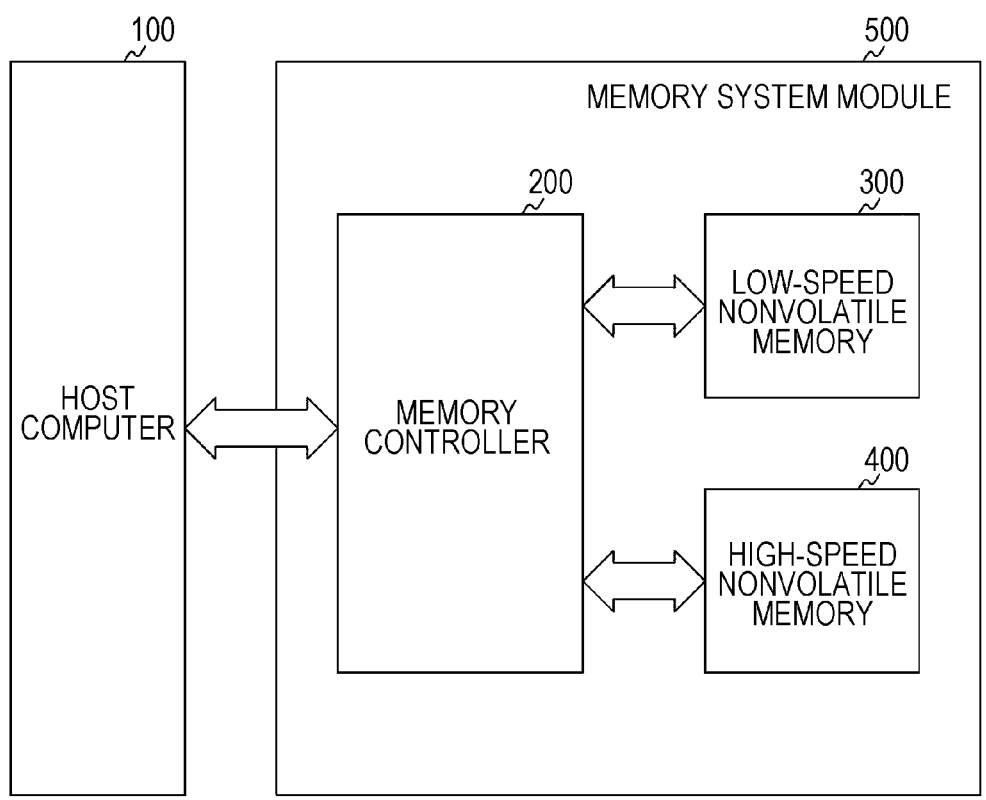
FIG. 1 is a figure illustrating an overview of a configuration of an information processing system according to an embodiment of the present technique.

FIG. 1 is a figure illustrating an overview of a configuration of an information processing system according to an embodiment of the present technique. This information processing system includes a host computer 100, a memory controller 200, a low-speed nonvolatile memory 300, and a high-speed nonvolatile memory 400. A memory system module 500 is constituted by the memory controller 200, the low-speed nonvolatile memory 300, and the high-speed nonvolatile memory 400.

The host computer 100 is configured to issue a command for requesting the memory system module 500 to perform reading processing, writing processing, and the like of data.

The memory controller 200 communicates with the host computer 100 to receive a command, and accesses the low-speed nonvolatile memory 300 or the high-speed nonvolatile memory 400. Which of the low-speed nonvolatile memory 300 or the high-speed nonvolatile memory 400 is accessed is determined by a logical address as explained later.

The memory controller 200 performs generation processing of error correction codes (ECCs) of the high-speed nonvolatile memory 400 and the low-speed nonvolatile memory 300, and performs error detection correction processing using the ECCs. More specifically, during writing of data, parities corresponding thereto are added to the data, and the data and the parities are written (which may be hereinafter referred to as symbolization). On the basis of the data and the parity during reading of data, the detection and correction of error are performed (which may be hereinafter referred to as decoding).

Both of the low-speed nonvolatile memory 300 and the high-speed nonvolatile memory 400 are nonvolatile memories (NVMs). The high-speed nonvolatile memory 400 has such property that the reading processing time is shorter than that of the low-speed nonvolatile memory 300. The reading processing time includes a reading time serving as memory characteristic and a time for command and data transfer with the memory interface. The low-speed nonvolatile memory 300 (which may be hereinafter abbreviated as a low-speed NVM) is considered to be, for example, a NAND flash memory. The high-speed nonvolatile memory 400 (which may be hereinafter abbreviated as a high-speed NVM) is considered to be, for example, a resistance change-type nonvolatile memory. It should be noted that the low-speed nonvolatile memory 300 is an example of a first memory as described in the claims. The high-speed nonvolatile memory 400 is an example of a second memory as described in the claims.

For example, the specification of the low-speed nonvolatile memory 300 is considered to be as follows. First, the semiconductor capacity is considered to be 16 G bytes. Reading or writing are considered to be performed with a page size of 4 K bytes data with 128 bytes parity or a page size of 8 K bytes data with 256 bytes parity, and data are considered to be erased in a block unit which is larger than the page.

For example, the specification of the high-speed nonvolatile memory 400 is considered to be as follows. First, the semiconductor capacity is considered to be 2 G bytes. Reading or writing are considered to be performed with a page size of 512 bytes data with 16 bytes parity. In this case, unlike the NAND flash memory, a memory that does not require erasing before writing is considered.

[Resistance State of High-Speed Nonvolatile Memory]

Figure 2:
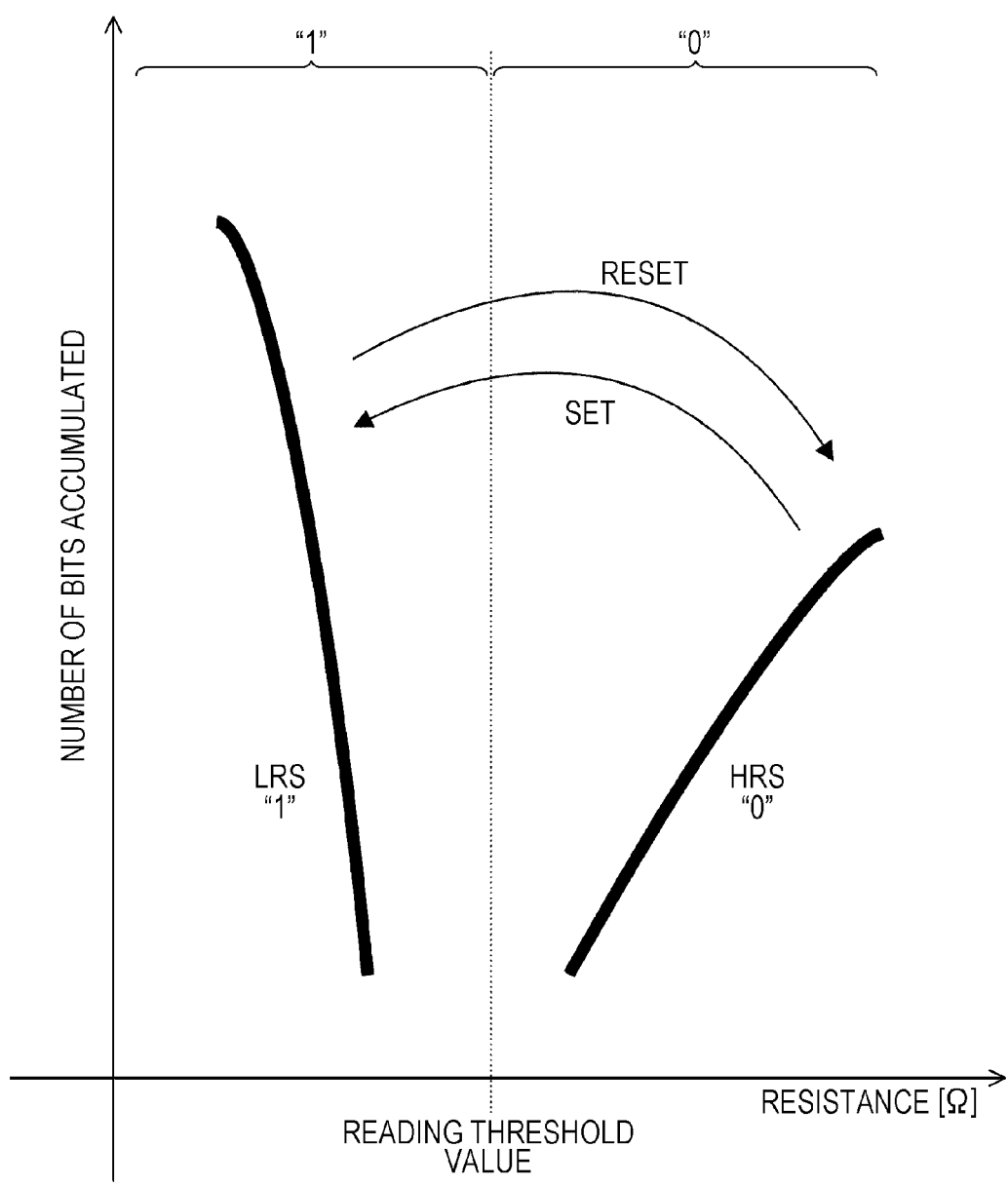
FIG. 2 is a figure illustrating a resistance distribution of a resistance change-type nonvolatile memory which is assumed to be a high-speed nonvolatile memory 400 according to an embodiment of the present technique.

FIG. 2 is a figure illustrating a resistance distribution of a resistance change-type nonvolatile memory which is assumed to be the high-speed nonvolatile memory 400 according to an embodiment of the present technique. In response to set operation, the resistance change-type nonvolatile memory changes to the low resistance state (LRS). In response to reset operation, the resistance change-type nonvolatile memory changes to the high resistance state (HRS). When the set operation and the reset operation are performed, a pulse voltage is applied to a cell. By increasing the voltage of the pulse voltage applied to the cell or increasing the pulse width thereof during the set operation and the reset operation, the holding characteristics of the data can be improved.

When data are read from the resistance change-type nonvolatile memory, the resistance state is determined on the basis of the reference resistance value indicated by the reading threshold value. When data are written to the resistance change-type nonvolatile memory, the set operation or the reset operation is performed and thereafter the data are read, and an operation is performed (verification operation) to verify whether the set operation or the reset operation is appropriately performed or not. In this verification operation, a verification threshold value obtained by making the reference resistance value into a stricter value may be used. Writing may not be performed correctly by only executing the set operation or the reset operation and the verification operation only once because of the effect of variation caused by the manufacturing process, and therefore, the set operation or the reset operation and the verification operation may be executed repeatedly multiple times. The holding characteristics of data can be improved by increasing the number of times this verification and writing are performed.

In the set operation and the reset operation, the directions of the voltages of the pulses applied to the cell are opposite to each other. During reading, a weak voltage is applied to the cell, which is the reading target, in the same direction as the reset operation. The reading processing is considered to be weak writing processing, and the cell is degraded because of reading. Therefore, a cell which is read many times tends to have a lower degree of holding characteristics.

A memory is realized that can store one bit with one memory cell by reversibly changing the resistance state between the low resistance state and the high resistance state. Since data are held even after the voltage is no longer applied, the memory may function as a nonvolatile memory. In general, data which are read from the cell in the low resistance state are considered to be treated as "1", and data which are read from the high resistance state are considered to be treated as "0". Alternatively, the low resistance state and the high resistance state may be associated with any of them.

[Configuration of Memory Controller]

Figure 3:
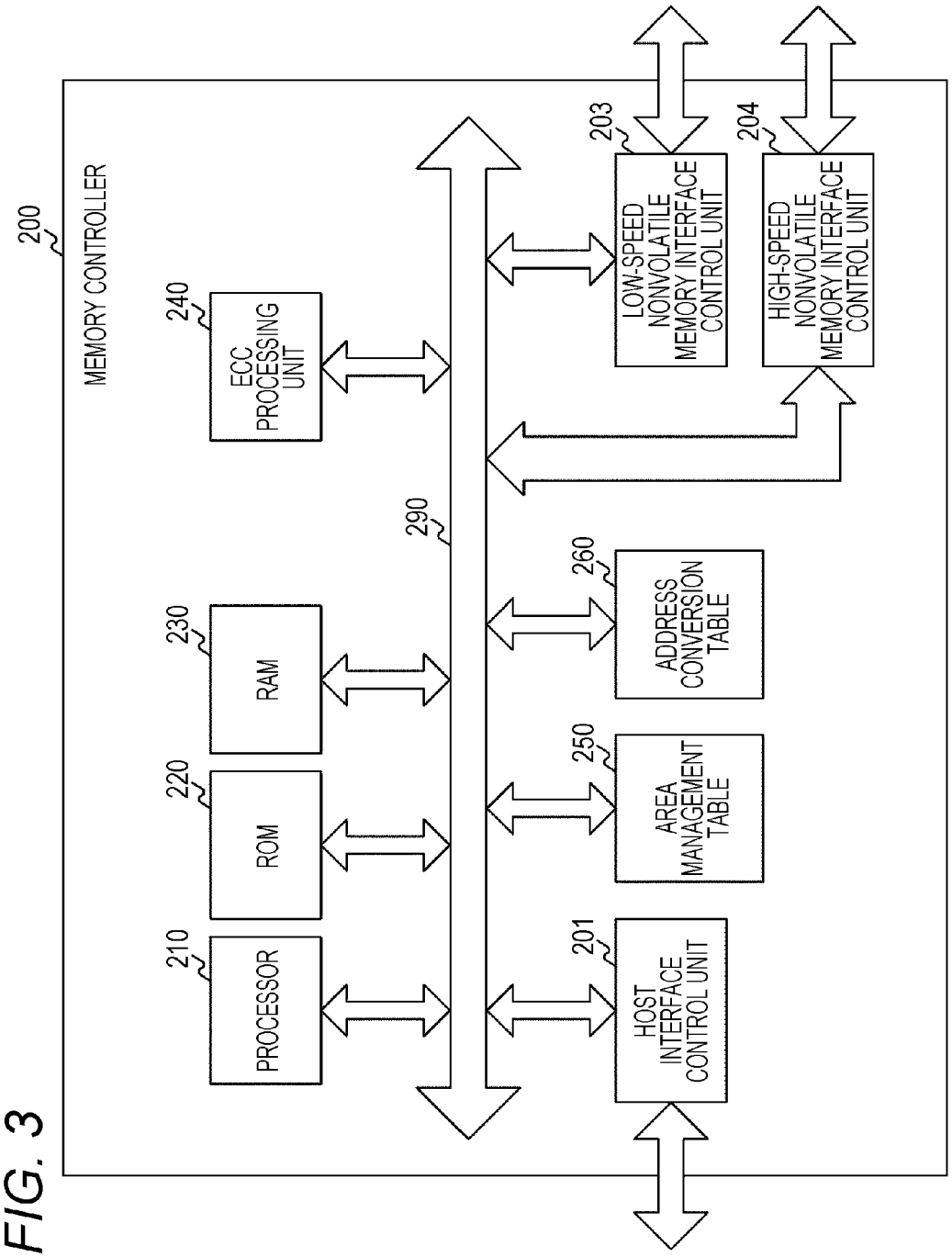
FIG. 3 is a figure illustrating an example of a configuration of a memory controller 200 according to an embodiment of the present technique.

FIG. 3 is a figure illustrating an example of a configuration of the memory controller 200 according to an embodiment of the present technique. This memory controller 200 includes a processor 210, a ROM 220, a RAM 230, an ECC processing unit 240, an area management table 250, and an address conversion table 260. The memory controller 200 includes a host interface control unit 201 controlling an interface with the host computer 100. The memory controller 200 includes a low-speed nonvolatile memory interface control unit 203 controlling an interface with the low-speed nonvolatile memory 300. The memory controller 200 includes a high-speed nonvolatile memory interface control unit 204 controlling an interface with the high-speed nonvolatile memory 400.

The processor 210 controls the entire memory controller 200. This processor 210 executes software stored in the ROM 220. This processor 210 analyzes a command issued by the host computer 100, and gives necessary request to the low-speed nonvolatile memory 300 or the high-speed nonvolatile memory 400. The ROM 220 is a memory storing a software program for controlling the storage system.

The RAM 230 is a volatile memory, and is used as a working memory for the processor 210 or used as an area for temporarily holding data for managing the low-speed nonvolatile memory 300 and the high-speed nonvolatile memory 400. The RAM 230 is also used as an area for temporarily holding data transferred between the host computer 100 and the memory controller 200. The RAM 230 is also used as an area for temporarily holding data transferred between the memory controller 200 and the low-speed nonvolatile memory 300 or the high-speed nonvolatile memory 400. The area management table 250 and the address conversion table 260 explained below may be held in the RAM 230.

The ECC processing unit 240 generates error correction codes (ECCs) of the high-speed nonvolatile memory 400 and the low-speed nonvolatile memory 300, and executes error detection and correction processing of data which are read from the high-speed nonvolatile memory 400 and the low-speed nonvolatile memory 300.

Figure 4:
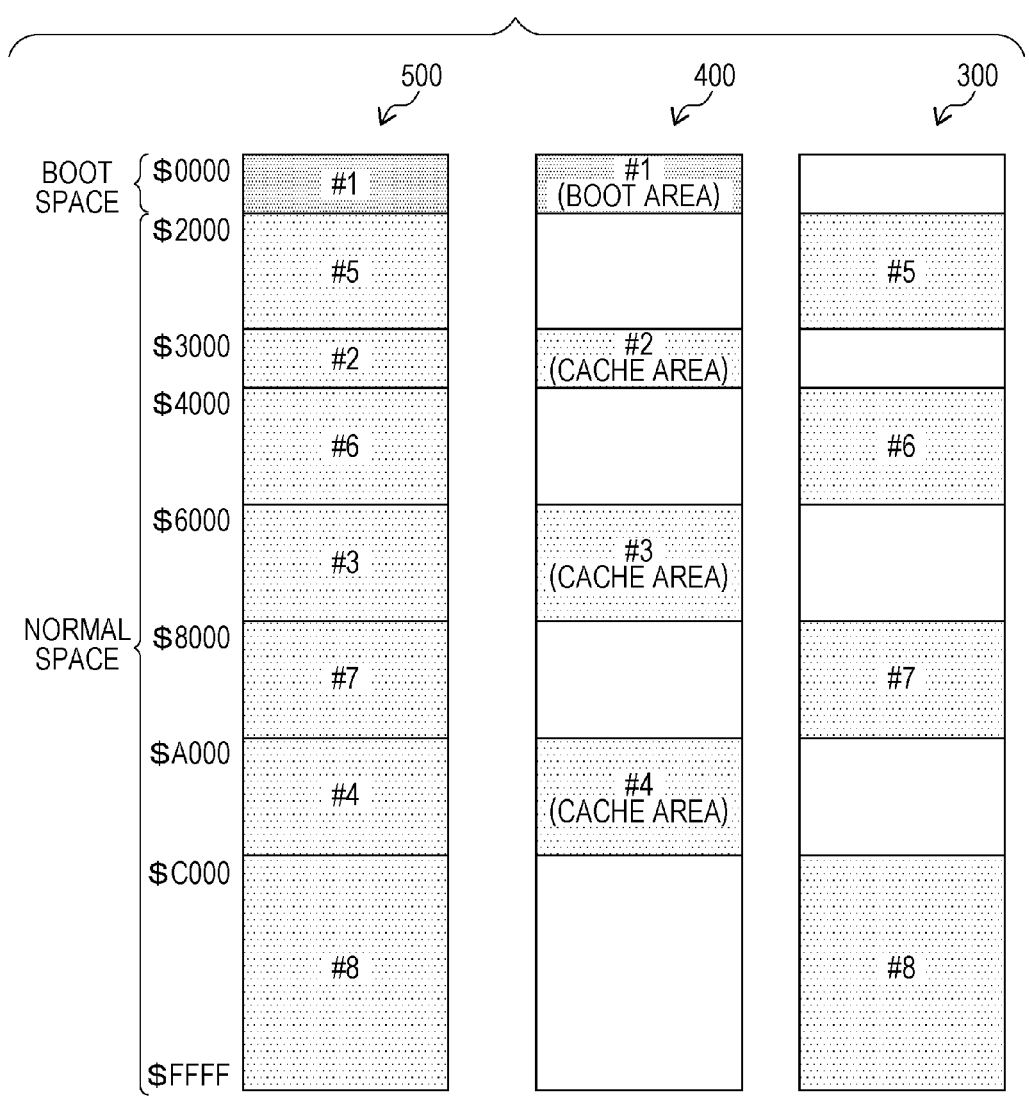
FIG. 4 is a figure illustrating an example of correspondence of a logical address space according to an embodiment of the present technique.

FIG. 4 is a figure illustrating an example of correspondence of a logical address space according to an embodiment of the present technique. The memory system module 500 is accessed by the host computer 100 using a logical address. The memory controller 200 of the memory system module 500 accesses the high-speed nonvolatile memory 400 or the low-speed nonvolatile memory 300 in accordance with the logical address.

The memory system module 500, the high-speed nonvolatile memory 400, and the low-speed nonvolatile memory 300 share a logical address space. The memory controller 200 refers to the area management table 250 to find which of the high-speed nonvolatile memory 400 or the low-speed nonvolatile memory 300 the logical address of the memory system module 500 is allocated to.

In order to access the high-speed nonvolatile memory 400 (the boot area or the cache area), the memory controller 200 converts the logical address of the memory system module 500 into the physical address of the high-speed nonvolatile memory 400 and accesses the high-speed nonvolatile memory 400. Likewise, in order to access the low-speed nonvolatile memory 300, the memory controller 200 converts the logical address of the memory system module 500 into the physical address of the low-speed nonvolatile memory 300 to access the low-speed nonvolatile memory 300.

The logical address space of the memory system module 500 includes a "boot space" and a "normal space". Access to the boot space in the logical address space of the memory system module 500 is associated so as to access the high-speed nonvolatile memory 400, and the area on the high-speed nonvolatile memory 400 thus associated is defined as a boot area. This boot space is an area for storing boot information, and this is assumed to be read and provided to the host computer 100 during system boot. The boot information is information necessary for activating the system, and includes, for example, a boot program, an operating system, a main application program, and the like. When the boot information is held in the high-speed nonvolatile memory 400, the speed of the reading of the boot information is increased, so that the system boot can be done at a higher speed. Hereinafter, an example of reading boot information during system boot will be explained. Alternatively, the present technique can be widely applied to not only the information that is read during booting but also the system information for operating the system. For example, other application programs that are used frequently after the booting are also examples of system information. More specifically, the system information described in the claims is a broad concept including the boot information. The system area described in the claims is a broad concept including the boot area.

On the other hand, access to the normal space in the logical address space of the memory system module 500 is associated so as to access the low-speed nonvolatile memory 300. However, since the high-speed nonvolatile memory 400 is used as a cache for the low-speed nonvolatile memory 300, a part of the normal space can be allocated to the high-speed nonvolatile memory 400. An area on the high-speed nonvolatile memory 400 allocated to the high-speed nonvolatile memory 400 is defined as a cache area. This cache area is an area for temporarily storing data of the low-speed nonvolatile memory 300, and an area for causing the high-speed nonvolatile memory 400 to function as the cache for the low-speed nonvolatile memory 300. When the writing data given by the host computer 100 are written to the low-speed nonvolatile memory 300, first, the writing data are written to the cache area of the high-speed nonvolatile memory 400. Then, at a predetermined point in time, the data are moved from the cache area to the proper area of the low-speed nonvolatile memory 300. Therefore, depending on the point in time when the data are read, the target data exist in any one of the cache area of the high-speed nonvolatile memory 400 or the low-speed nonvolatile memory 300. On the other hand, the data in the boot space is not moved to the low-speed nonvolatile memory 300, and therefore, the data exist in the boot area at all times.

In any of reading and writing in the access to the boot space of the memory system module 500, reading or writing processing is performed on the target of the boot area of the high-speed nonvolatile memory 400.

In the reading in the access to the normal space, when the logical address of the memory system module 500, which is the target of the reading, is associated with the cache area of the high-speed nonvolatile memory 400, then the reading is performed to read the cache area of the high-speed nonvolatile memory 400. When the logical address of the memory system module 500, which is the target of the reading, is not associated with the cache area of the high-speed nonvolatile memory 400, then the reading is performed to read the low-speed nonvolatile memory 300.

In the writing to the normal space, when the logical address of the memory system module 500, which is the target of the reading, is associated with the cache area of the high-speed nonvolatile memory 400, then the writing is performed to write the data to the cache area of the high-speed nonvolatile memory 400. When the logical address of the memory system module 500, which is the target of the reading, is not associated with the cache area of the high-speed nonvolatile memory 400, then a cache area of the high-speed nonvolatile memory 400 is newly allocated, and the writing is performed to write the data to the cache area of the high-speed nonvolatile memory 400. However, when the entire capacity of the high-speed nonvolatile memory 400 is already used, the data of the high-speed nonvolatile memory 400 may be moved to the low-speed nonvolatile memory 300, and thereafter, a cache area may be newly allocated, and the data may be written to the high-speed nonvolatile memory 400. Alternatively, when the entire capacity of the high-speed nonvolatile memory 400 is already used as described above, a cache area may not be newly allocated to the high-speed nonvolatile memory 400, and the data may be written to the low-speed nonvolatile memory 300 without using the high-speed nonvolatile memory 400.

Figure 5:
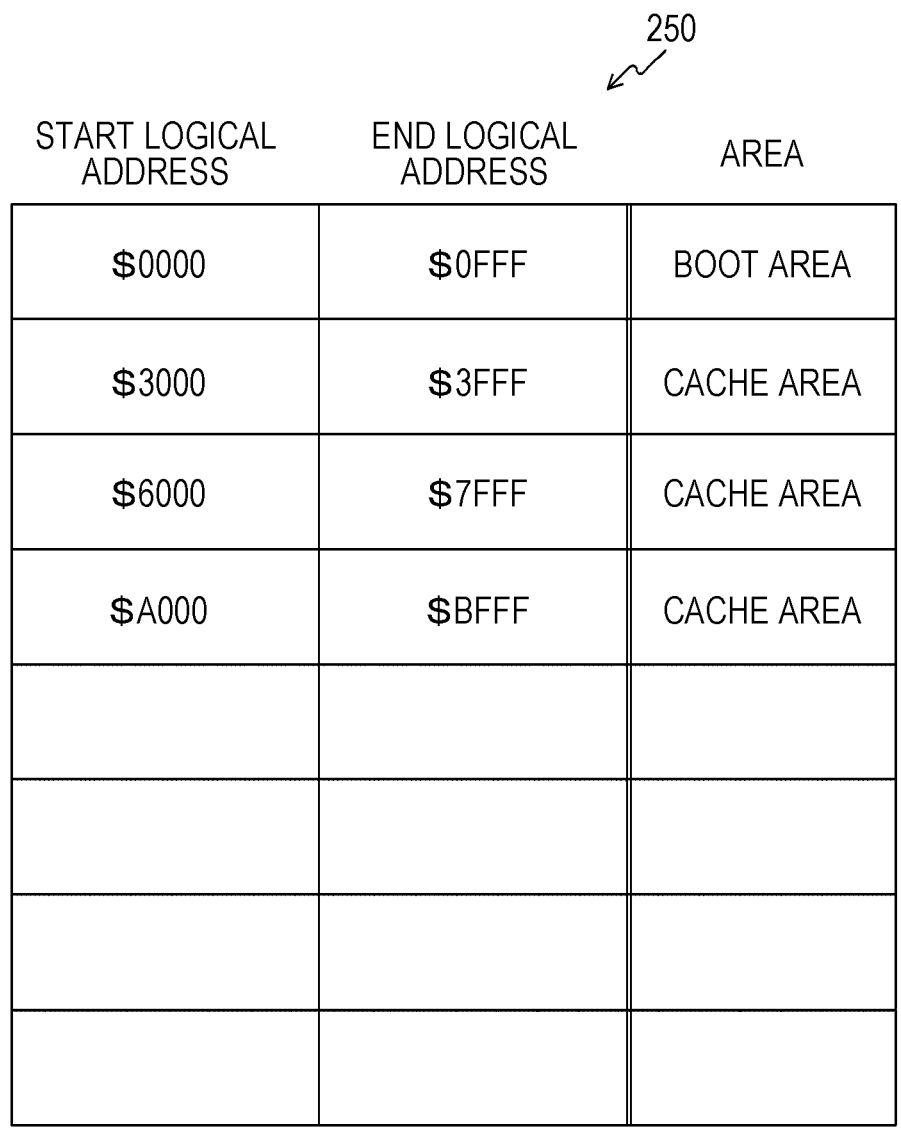
FIG. 5 is a figure illustrating an example of a configuration of an area management table 250 according to an embodiment of the present technique.

FIG. 5 is a figure illustrating an example of a configuration of the area management table 250 according to an embodiment of the present technique. This area management table 250 is a table illustrating an area which is in the logical address space of the memory system module 500 and which is associated with the boot area or the cache area of the high-speed nonvolatile memory 400. A logical address of the memory system module 500 that does not exist in the area management table 250 is allocated to the low-speed nonvolatile memory 300.

In this example, the corresponding relationship between the logical addresses of the memory system module 500 and the boot area or the cache areas of the high-speed nonvolatile memory 400 is managed. The cache areas exist as the cache for the normal space in a dispersed manner, and therefore multiple entries of the cache areas are recorded. The boot space is considered to be continuous, and therefore, a single entry is assumed. However, multiple entries of the boot spaces may exist.

In this example, the area management table 250 records a start logical address and an end logical address. Alternatively, when the size of the logical address space for a single entry is fixed, only the start address may be configured to be recorded.

It should be noted that this area management table 250 is saved in the low-speed nonvolatile memory 300 or the high-speed nonvolatile memory 400 during shut down and the like.

Figure 6:
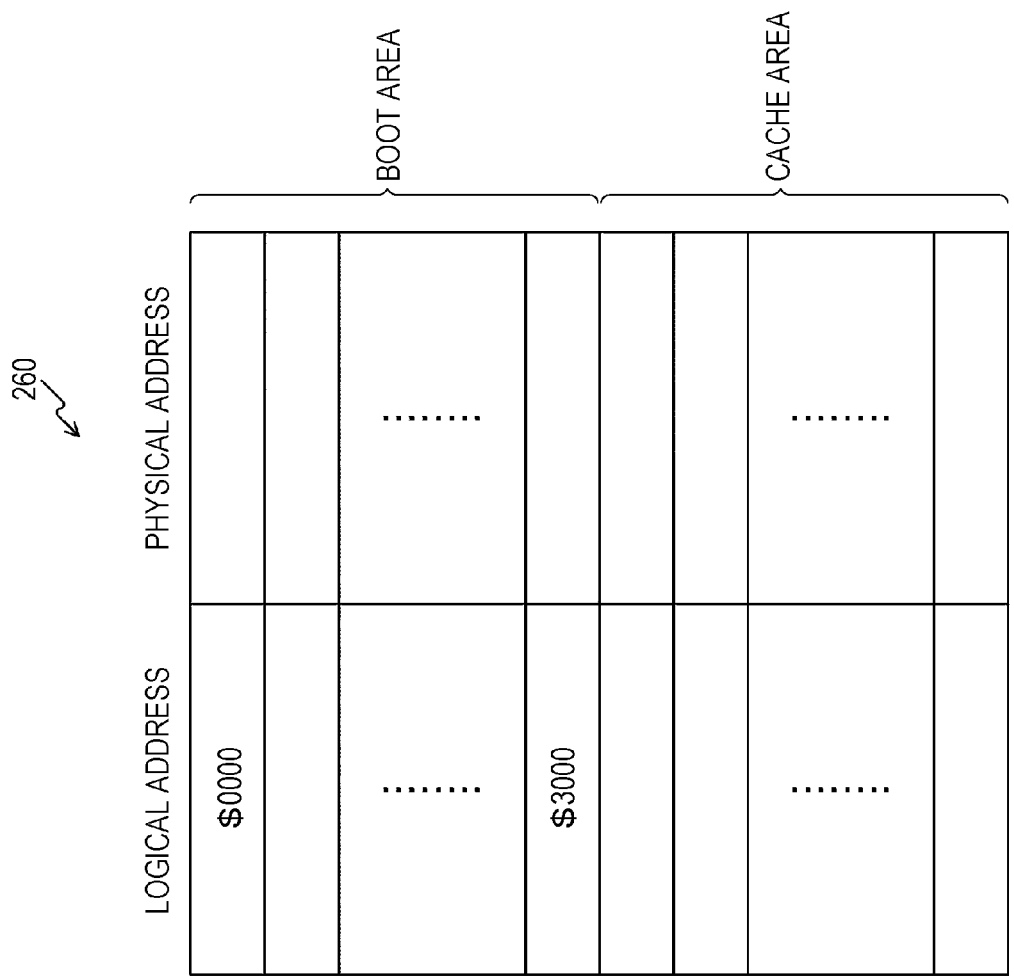
FIG. 6 is a figure illustrating an example of a configuration of an address conversion table 260 according to an embodiment of the present technique.

FIG. 6 is a figure illustrating an example of a configuration of the address conversion table 260 according to an embodiment of the present technique. This address conversion table 260 is a table for converting a logical address into a physical address of the low-speed nonvolatile memory 300 or the high-speed nonvolatile memory 400. In this case, a configuration for conversion into a physical address of the high-speed nonvolatile memory 400 is shown, and this has an entry including a pair of a physical address and a logical address of the boot area and the cache area. Likewise, for the low-speed nonvolatile memory 300, an entry for conversion from a logical address into a physical address is provided.

When a logical address accessed by the host computer 100 is associated with the boot area, the memory controller 200 refers to the address conversion table 260, and converts the logical address into a physical address of the high-speed nonvolatile memory 400. Therefore, the memory controller 200 performs control so as to access a physical page of the boot area of the high-speed nonvolatile memory 400 corresponding to the logical address. On the other hand, when a logical address accessed by the host computer 100 is associated with the cache area, the memory controller 200 refers to the address conversion table 260 to convert a logical address into a physical address of the high-speed nonvolatile memory 400. Therefore, the memory controller 200 performs control so as to access a physical page of the cache area of the high-speed nonvolatile memory 400 corresponding to the logical address.

When a logical address accessed by the host computer 100 is associated with the low-speed nonvolatile memory 300, the memory controller 200 refers to the address conversion table 260 to convert a logical address into a physical address of the low-speed nonvolatile memory 300. Therefore, the memory controller 200 performs control so as to access a physical page of the cache area of the low-speed nonvolatile memory 300 corresponding to the logical address.

Figure 7:
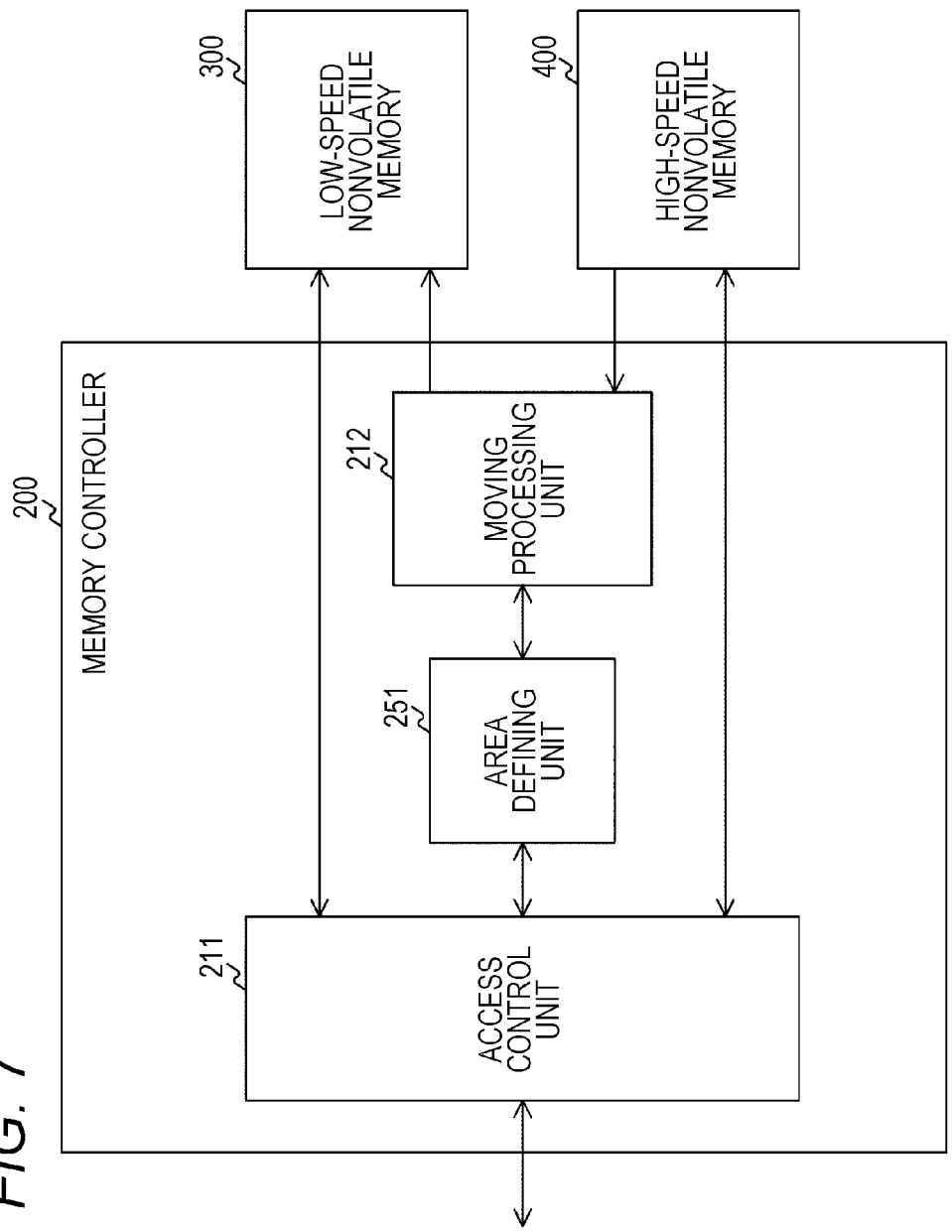
FIG. 7 is a figure illustrating an example of a configuration of functions of a memory controller 200 according to an embodiment of the present technique.

FIG. 7 is a figure illustrating an example of a configuration of functions of the memory controller 200 according to an embodiment of the present technique. The memory controller 200 has the functions of the area defining unit 251, the access control unit 211, and the moving processing unit 212.

The area defining unit 251 is configured to define the boot area and the cache area in the high-speed nonvolatile memory 400. More specifically, the area defining unit 251 holds the start address and the end address in the logical address space of the boot area and the cache area, so that the defining unit 251 does management for determining as to which area of the high-speed nonvolatile memory 400 the access target is or whether the access target is the low-speed nonvolatile memory 300. This area defining unit 251 is achieved with, for example, the area management table 250.

The access control unit 211 accesses the low-speed nonvolatile memory 300 or the high-speed nonvolatile memory 400 in accordance with a command given by the host computer 100. More specifically, during writing, in accordance with which of the boot area and the cache area of the high-speed nonvolatile memory 400 the access target corresponds to or whether the access target corresponds to the low-speed nonvolatile memory 300, the access control unit 211 performs control so as to write the data in accordance with the writing method defined in advance with regard to the area. The writing method is considered to be a method for previously defining not only the data access size and the data size of an ECC-giving unit but also the pulse width and the voltage in the writing process, and the verification threshold value, the number of times of verifications, and the like.

During reading, the access control unit 211 determines which of the boot area and the cache area of the high-speed nonvolatile memory 400 the access target corresponds to or whether the access target corresponds to the low-speed nonvolatile memory 300. Then, the access control unit 211 performs control so as to perform reading in accordance with the reading method defined in advance with regard to that area.

As described above, the access control unit 211 can access the area in accordance with the data access size, the data size of the ECC-giving unit defined individually for each of the boot area and the cache area. Data such as the OS, applications, and the like are arranged in the boot area, and therefore, there are many large sized data continuously read, for which a high degree of reliability is necessary. Therefore, in the boot area, the data access size is large, and accordingly, the data size of the ECC-giving unit is also desirably large. On the other hand, when the boot information is considered to be written to the boot area before the shipment of the product, the immediacy of writing is not necessarily required. Therefore, there is a way to make the verification threshold value into a stricter value to increase the number of times the verification is performed, so that the writing process is performed by raising the level of reliability of the data. Alternatively, it may also be effective to make the pulse width wider and increase the voltage during the writing, so that the holding characteristics are increased, and the level of reliability is raised. When the pulse width and the voltage are increased during the writing, the number of times the memory can be rewritten (lifetime) tends to decrease, but the boot area has such characteristics that it is read many times but is rewritten few times, and therefore, no problem would be considered to occur even if such method is employed. In this case, for example, a highly reliable writing method is employed as a writing method for the boot area. Alternatively, a normal writing method may be employed. This selection of the writing method may be designated by the host computer 100, or the writing method may be selectively used based on the determination made by the memory controller 200 itself.

On the other hand, in the cache area, it is demanded to access small data at a high speed. In addition, the data in the cache area are moved to the low-speed nonvolatile memory 300 in a short period of time, and when this is taken into consideration, the reliability of the cache area is not regarded as so much important. Therefore, in the cache area, the data access size is preferably small, and the data size of the ECC-giving unit is also preferably small. It is also effective to reduce the writing time by limiting the number of times the verification is performed. It is also effective to, during the verification reading during the writing process, increase the sense current to do the verification reading in a short period of time, and perform writing at a high speed. In this case, for example, the method capable of finishing the writing in a short period of time is employed as a writing method for the cache area. Alternatively, a normal writing method may also be employed. This selection of the writing method may be designated by the host computer 100, or the writing method may be selectively used based on the determination made by the memory controller 200 itself.

It should be noted that the access control unit 211 is achieved with, for example, the processor 210.

The moving processing unit 212 is configured to move the data stored in the cache area of the high-speed nonvolatile memory 400 to the low-speed nonvolatile memory 300 at a predetermined point in time. The point in time when the data are moved is considered to be, for example, a case where no access occurs from the host computer 100 for a certain period of time and a case where a certain amount of data which is more than a predetermined threshold value are accumulated in the cache area.

When the data are moved, first, the data are read from the cache area of the high-speed nonvolatile memory 400, and the error detection correction processing based on the ECC decoding is performed with the data access size of the cache area. Thereafter, for the decoded data, an ECC is generated with the data size of the ECC-giving unit defined for the low-speed nonvolatile memory 300, and the data as well as the ECC are written to the low-speed nonvolatile memory 300. When the data size of the ECC-giving unit is the same in the cache area and in the low-speed nonvolatile memory 300, error detection and correction are performed on the data which are read from the cache area, and thereafter, the data may be moved by writing the data to the low-speed nonvolatile memory 300 as they are. The moving processing unit 212 is achieved with, for example, the processor 210.

<2. Operation of Embodiment>

[Operation Timing of Memory Controller]

Figure 8:
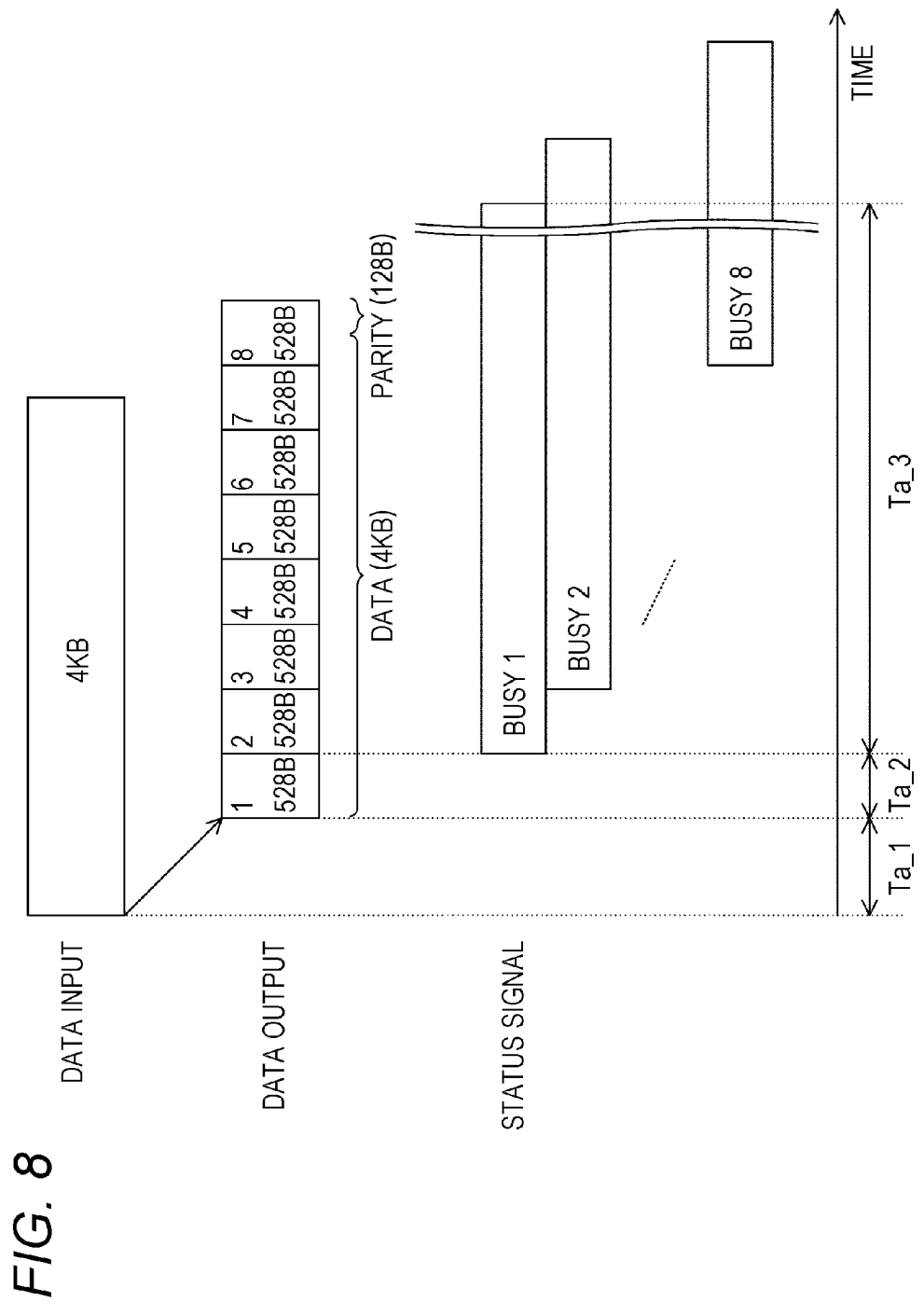
FIG. 8 is a figure illustrating an example of write timing for writing to a boot area according to an embodiment of the present technique.

FIG. 8 is a figure illustrating an example of write timing for writing to the boot area according to an embodiment of the present technique. In this case, for example, the data size of the ECC-giving unit of the boot area is 4 K bytes, and the parity size of the ECC is 128 bytes. The host computer 100 is considered to issue a 4 K bytes write command, and the memory controller 200 is considered to receive the write command.

When the host computer 100 issues the write command to the memory controller 200, the host computer 100 continuously transmits 4 K bytes data. The memory controller 200 generates the received 4 K bytes data with a data size of 4 K bytes and a parity of 128 bytes (totally 4 K bytes+128 bytes). The memory controller 200 writes, eight times, the parity-attached data to the high-speed nonvolatile memory 400 on every page size (528 bytes) according to the writing method of the boot area.

The high-speed nonvolatile memory 400 performs writing to the memory cell using the received page as a unit in accordance with the writing method of the boot area designated. In this case, an eight bank configuration is assumed, and this shows how the data are written to each bank in order. The status signal of each bank is in the busy state when the writing starts, and the busy state is terminated when the writing ends.

In this case, Ta_1, Ta_2, Ta_3 in the figure are as shown below.

Ta_1: time from when the memory controller 200 receives the writing data to immediately before the data of 512 bytes of the ECC-giving unit which is 4 K bytes are started to be transferred to the high-speed nonvolatile memory 400

Ta_2: time it takes to transfer data for one page from the memory controller 200 to the high-speed nonvolatile memory 400

Ta_3: time it takes for the high-speed nonvolatile memory 400 to write one page (528 bytes) according to the writing method of the boot area In the time (Ta_3) in which the writing is performed according to the writing method of the boot area, the verification is considered to be performed for many times, and the time (Ta_3) is longer than the time it takes for normal writing.

Figure 9:
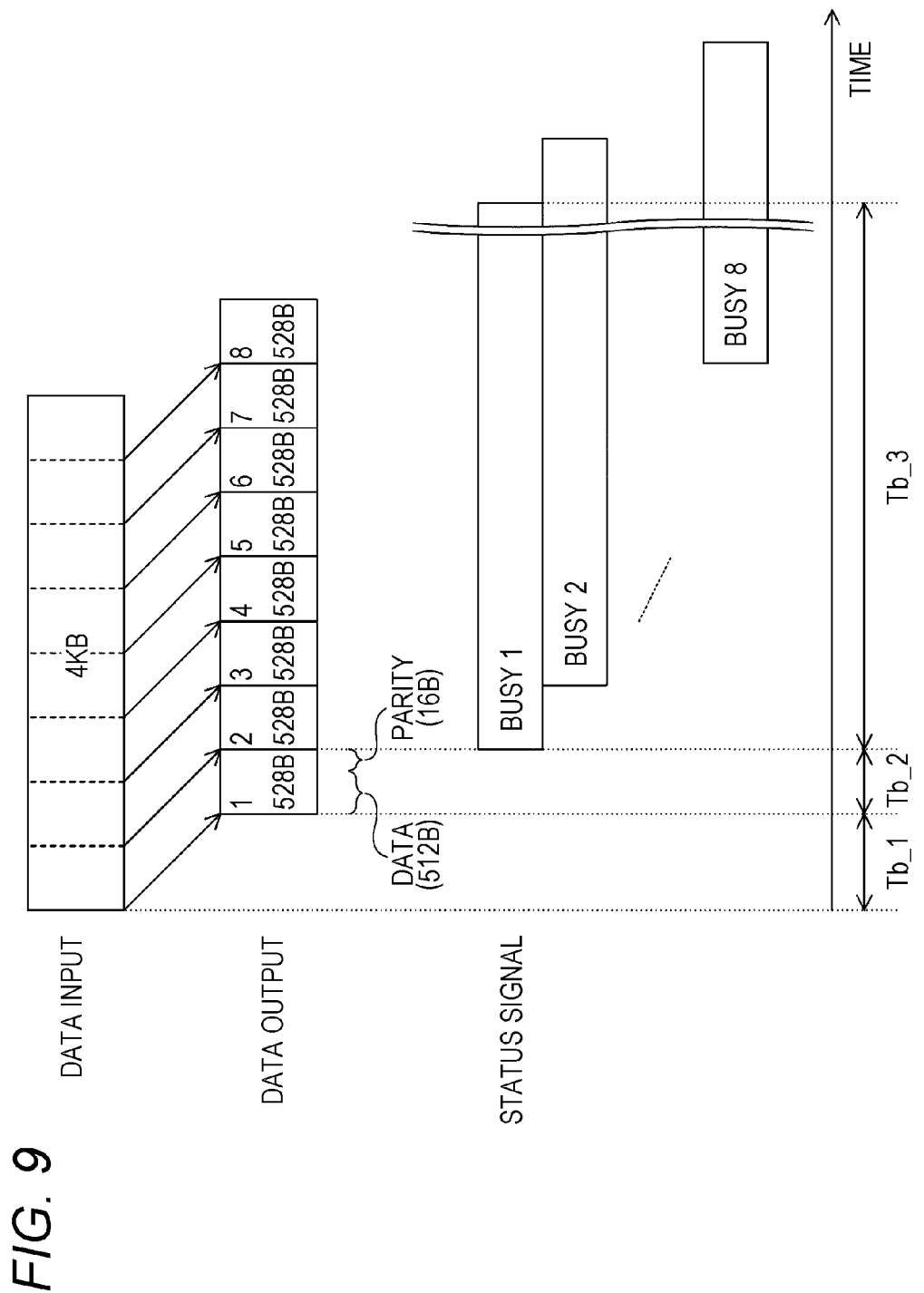
FIG. 9 is a figure illustrating an example of write timing for writing to a cache area according to an embodiment of the present technique.

FIG. 9 is a figure illustrating an example of write timing for writing to the cache area according to an embodiment of the present technique. In this case, for example, the data size of the ECC-giving unit of the cache area is 512 bytes, and the parity of the ECC is 16 bytes. The host computer 100 is considered to issue a 4 K bytes write command, and the memory controller 200 is considered to receive the write command.

When the host computer 100 issues the write command to the memory controller 200, the host computer 100 continuously transmits 4 K bytes data. The memory controller 200 generates the received 4 K bytes data with a data size of 512 bytes and a parity of 16 bytes. More specifically, the data are made into eight pieces of 528 bytes data. The memory controller 200 writes, eight times, the parity-attached data to the high-speed nonvolatile memory 400 on every page size (528 bytes) according to the writing method of the cache area.

The high-speed nonvolatile memory 400 performs writing to the memory cell using the received page as a unit in accordance with the writing method of the cache area designated. In this case, an eight bank configuration is assumed, and this shows how the data are written to each bank in order.

In this case, Tb_1, Tb_2, Tb_3 in the figure are as shown below.

Tb_1: time from when the memory controller 200 receives the writing data and processes an ECC of 512 bytes of the ECC-giving unit which is 4 K bytes to immediately before the data transfer to the high-speed nonvolatile memory 400 starts Tb_2: time it takes to transfer data for one page from the memory controller 200 to the high-speed nonvolatile memory 400

Tb_3: time it takes for the high-speed nonvolatile memory 400 to write one page (528 bytes) according to the writing method of the cache area In the time (Tb_3) in which the writing is performed according to the writing method of the cache area, the number of times the verification is performed can be reduced and therefore, the time (Tb_3) is configured to be shorter than the time it takes for normal writing.

In this case, the minimum access unit from the host computer 100 is considered to be 512 bytes, and accordingly the data access size of the cache area is configured to be 512 bytes. In contrast, for example, when the minimum access unit from the host computer 100 is 4 K bytes, both of the data access sizes for the boot area and the cache area may be 4 K bytes.

Figure 10:
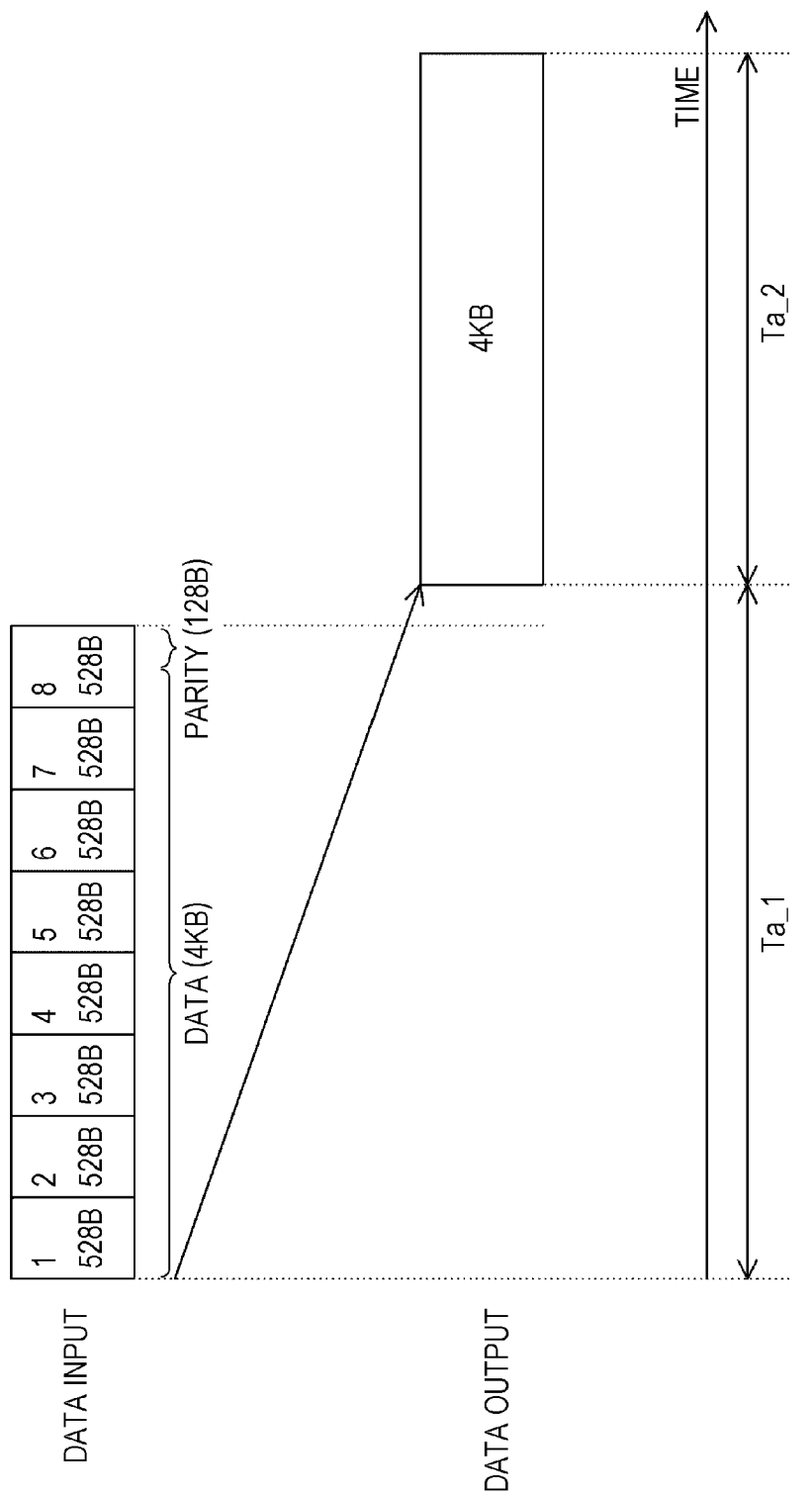
FIG. 10 is a figure illustrating an example of reading timing for reading from a boot area according to an embodiment of the present technique.

FIG. 10 is a figure illustrating an example of reading timing for reading from the boot area according to an embodiment of the present technique. In this case, for example, the data access size of the boot area is 4 K bytes, and the parity size of the ECC is 128 bytes. The host computer 100 is considered to issue a 4 K bytes read command, and the memory controller 200 is considered to receive the read command.

When the host computer 100 issues the 4 K bytes read command to the memory controller 200, the memory controller 200 reads 4 K bytes+128 bytes from the high-speed nonvolatile memory 400. Accordingly, the memory controller 200 issues, eight times, a read request on every page size (528 bytes). When the memory controller 200 receives 4K bytes+128 bytes data, the memory controller 200 performs error detection correction processing based on the ECC, and where there is an error, the error is corrected, and 4 K bytes data which are to be transferred to the host computer 100 are prepared. When the preparation of 4 K bytes data is finished, the memory controller 200 transfers 4 K bytes data to the host computer 100.

In this case, Ta_1, Ta_2 in the figure are as shown below.

Ta_1: time from when the memory controller 200 receives 4K bytes+128 bytes data from the high-speed nonvolatile memory 400 and performs the ECC decoding to when the memory controller 200 finishes the preparation of 4K bytes data which are to be transferred to the host computer 100

Ta_2: time it takes for the memory controller 200 to transfer the 4K bytes data to the host computer 100

In the read operation for reading the boot area, the error detection correction processing based on the ECC is started when the first 512 bytes data are received, and is finished after the 4K bytes data have been received. Therefore, after the 4K bytes data have been received, the data transfer to the host computer 100 is started.

Figure 11:
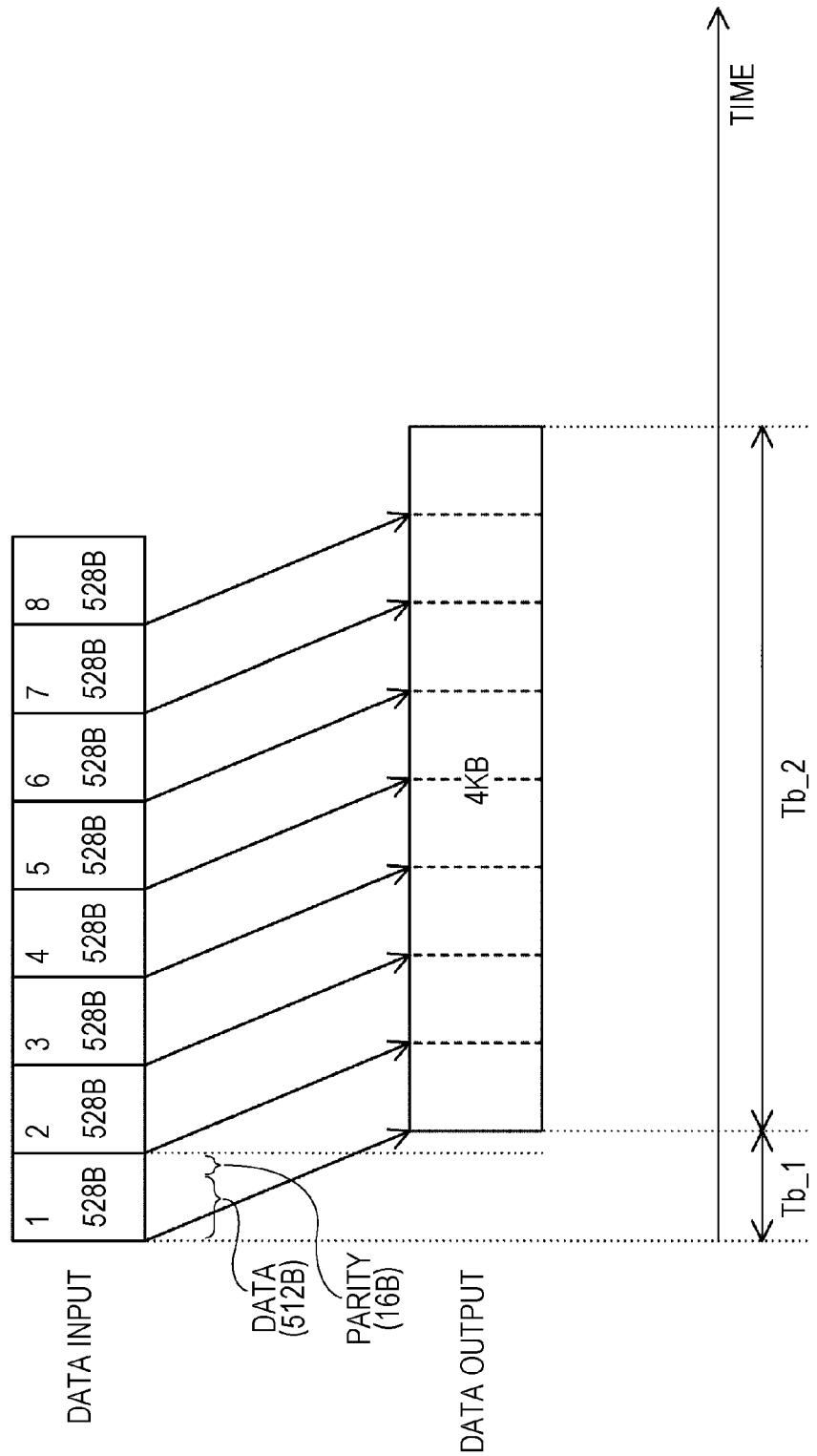
FIG. 11 is a figure illustrating an example of reading timing for reading from a cache area according to an embodiment of the present technique.

FIG. 11 is a figure illustrating an example of reading timing for reading from the cache area according to an embodiment of the present technique. In this case, for example, the data access size of the cache area is 512 bytes, and the parity size of the ECC is 16 bytes. The host computer 100 is considered to issue a 4 K bytes write command, and the memory controller 200 is considered to receive the write command.

When the host computer 100 issues the 4 K bytes read command to the memory controller 200, the memory controller 200 reads 4 K bytes+128 bytes from the high-speed nonvolatile memory 400. Accordingly, the memory controller 200 issues, eight times, a read request on every page size (528 bytes). Every time the memory controller 200 receives 528 bytes data, the memory controller 200 performs error detection correction processing based on the ECC, and where there is an error, the error is corrected, and 512 bytes data which are to be transferred to the host computer 100 are prepared. Every time the 512 bytes data are prepared, the memory controller 200 transfers the 512 bytes data to the host computer 100.

In this case, Tb_1, Tb_2 in the figure are as shown below. Tb_1: time from when the memory controller 200 receives 528 bytes data from the high-speed nonvolatile memory 400 and performs the ECC decoding to when the memory controller 200 finishes the preparation of 512 bytes data which are to be transferred to the host computer 100 Tb_2: time it takes for the memory controller 200 to transfer the 4K bytes data to the host computer 100

In the read operation for reading the cache area, as soon as the first 512 bytes data are prepared, the data can be transferred to the host computer 100, and therefore, the latency can be reduced as compared with the case of the boot area.

[Processing Procedure of Memory Controller]

Figure 12:
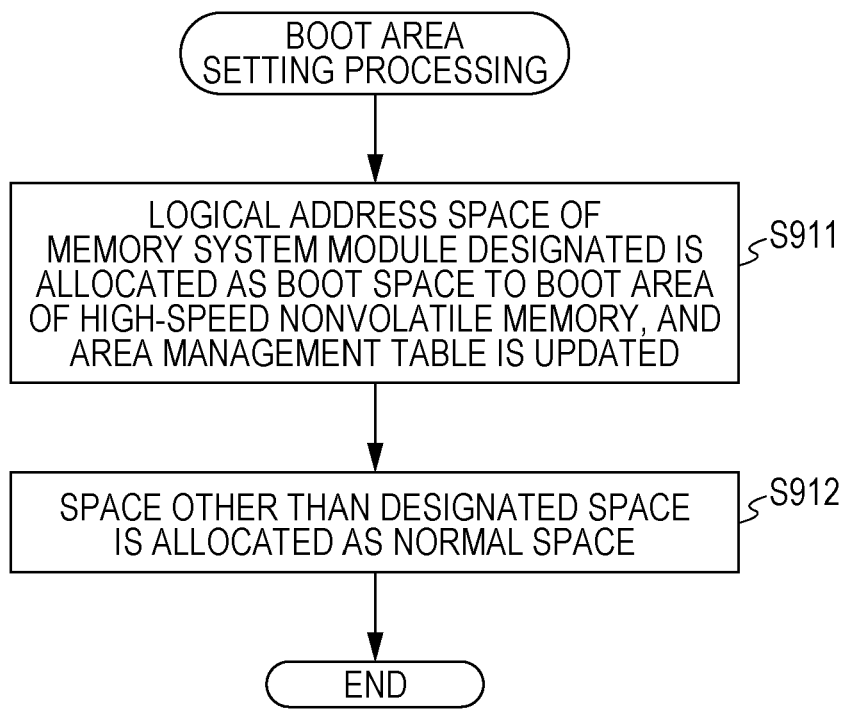
FIG. 12 is a flow diagram illustrating an example of processing procedure of boot area setting processing of a memory controller 200 according to an embodiment of the present technique.

FIG. 12 is a flow diagram illustrating an example of processing procedure of boot area setting processing performed by the memory controller 200 according to an embodiment of the present technique. The host computer 100 commands the memory controller 200 to set a boot area by issuing, for example, a boot area setting command. The host computer 100 designates a boot area based on a logical address and the like.

When the memory controller 200 receives the boot area setting command, the memory controller 200 allocates the designated logical address space of the memory system module 500 as the boot space to the boot area of the high-speed nonvolatile memory 400 (step S911). More specifically, the start logical address and the end logical address are set, as the boot area, in the area management table 250.

Then, the space other than the designated space is allocated as the normal space (step S912).

Figure 13:
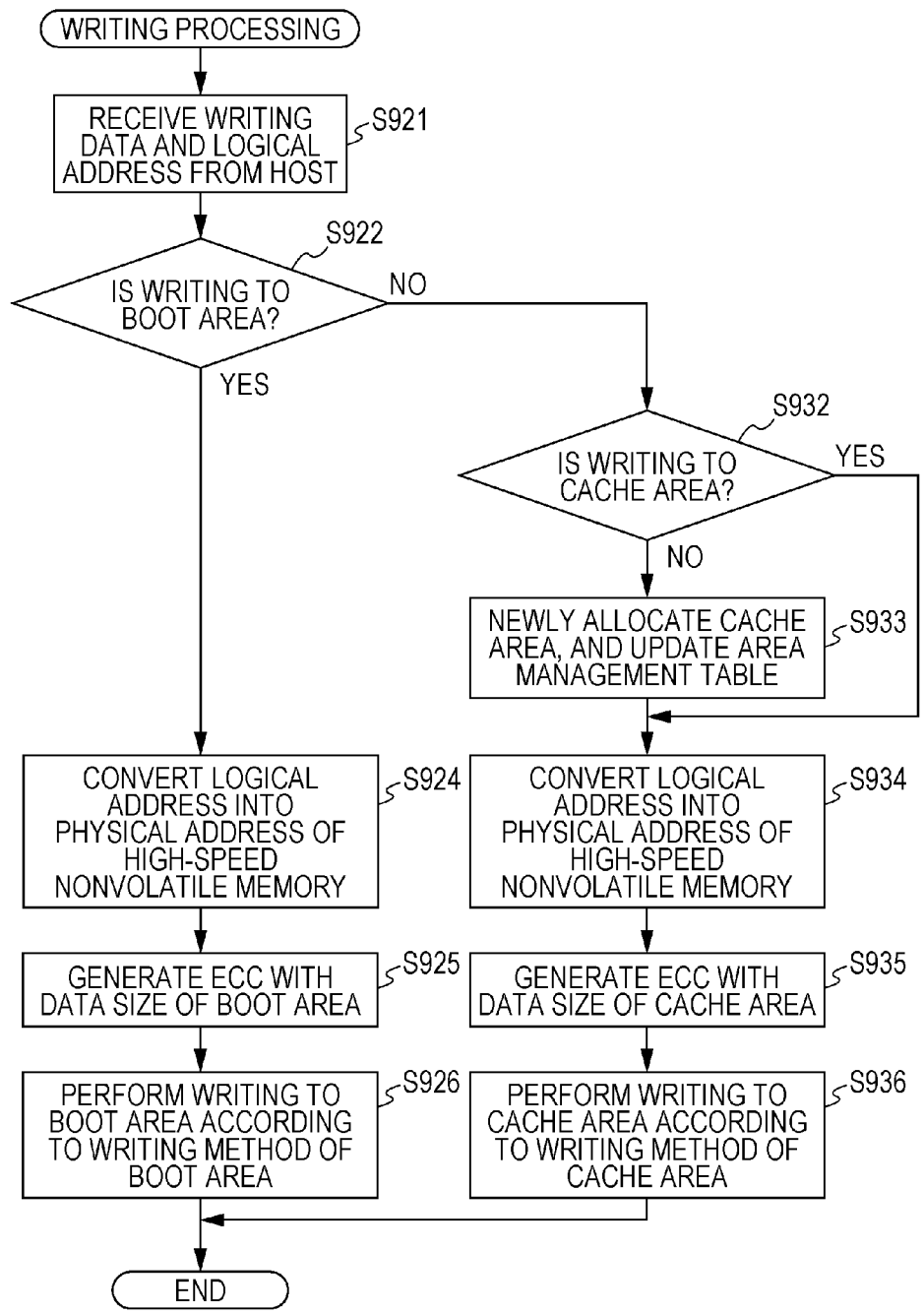
FIG. 13 is a flow diagram illustrating an example of processing procedure of writing processing of the memory controller 200 according to an embodiment of the present technique.

FIG. 13 is a flow diagram illustrating an example of processing procedure of writing processing performed by the memory controller 200 according to an embodiment of the present technique. The host computer 100 issues a write command to the memory controller 200. With the write command, the write destination logical address and the size are designated. After the write command is transmitted, the writing data are then transmitted.

The memory controller 200 receives the logical address and the writing data, which are to be written, from the host computer 100 (step S921). The memory controller 200 refers to the area management table 250 on the basis of the logical address of the received write command to determine whether the write command indicates writing to the boot area or not (step S922). When the write command indicates writing to the boot area (step S922: Yes), the memory controller 200 refers to the address conversion table 260, thus converting the logical address into a physical address of the high-speed nonvolatile memory 400 (step S924). Then, an ECC is generated for the data size of the ECC-giving unit of the boot area (for example, 4K bytes) (step S925). Then, the boot area is written using the writing method of the boot area (step S926).

When the write command does not indicate the writing to the boot area (step S922: No), the memory controller 200 refers to the area management table 250 to determine whether the write command indicates writing to the cache area or not (step S932). When the write command does not indicate the writing to the cache area (step S932: No), a cache area is newly allocated to the high-speed nonvolatile memory 400 (step S933). More specifically, the start logical address and the end logical address are set, as the cache area in the area management table 250. However, when the entire capacity of the high-speed nonvolatile memory 400 is used, the data in the high-speed nonvolatile memory 400 may be moved to the low-speed nonvolatile memory 300, and thereafter a cache area may be newly allocated, and the data may be written to the high-speed nonvolatile memory 400.

When the write command indicates the writing to the cache area (step S932: Yes), or, after the cache area is allocated (step S933), the memory controller 200 converts the logical address to a physical address of the high-speed nonvolatile memory 400 (step S934). Then, an ECC is generated for the data size of the ECC-giving unit of the cache area (for example, 512 bytes) (step S935). Then, the cache area is written using the writing method of the cache area (step S936).

Figure 14:
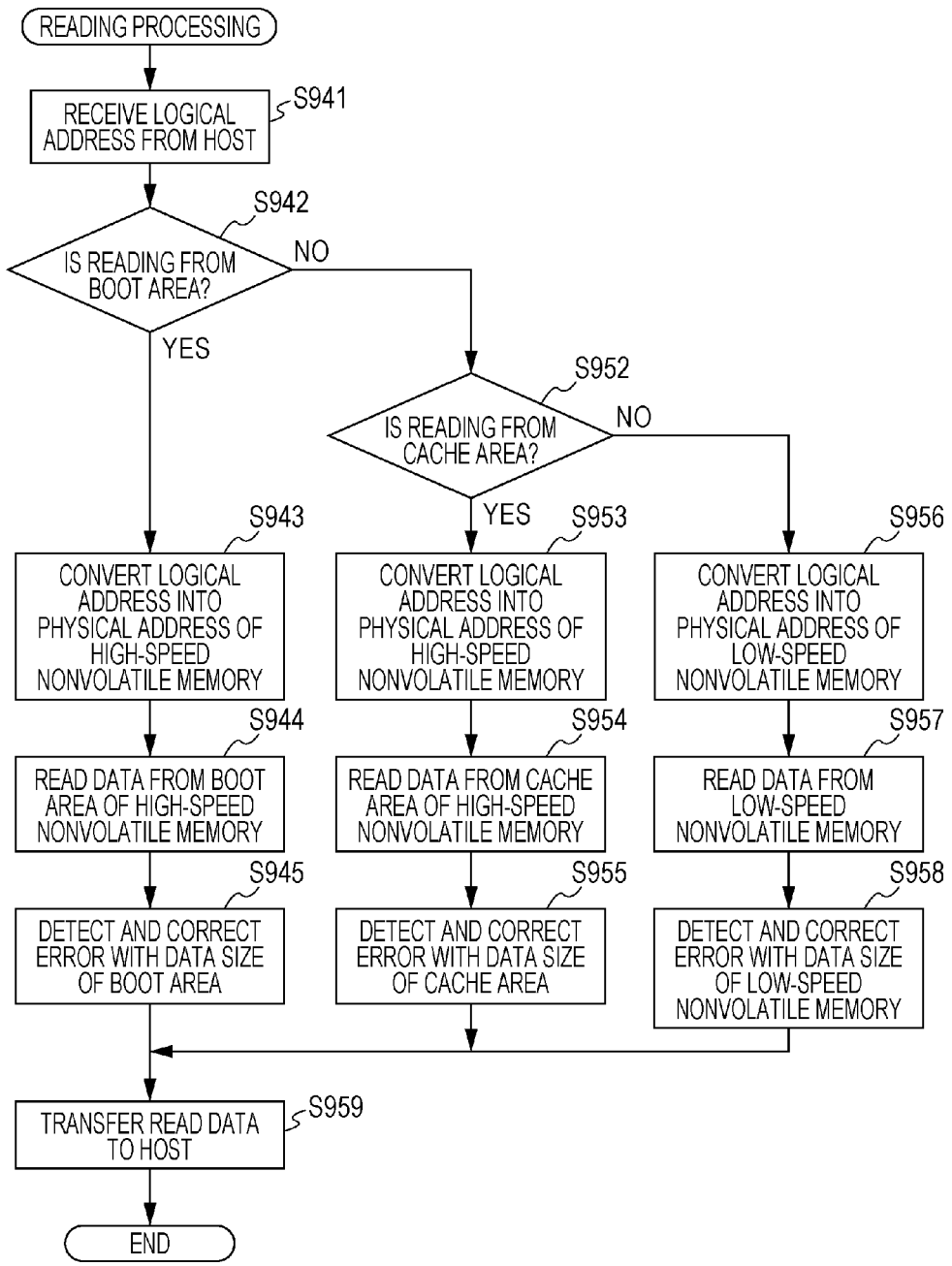
FIG. 14 is a flow diagram illustrating an example of processing procedure of reading processing of the memory controller 200 according to an embodiment of the present technique.

FIG. 14 is a flow diagram illustrating an example of processing procedure of reading processing performed by the memory controller 200 according to an embodiment of the present technique. The host computer 100 issues a read command to the memory controller 200. With the read command, the reading target logical address and the size are designated.

The memory controller 200 receives the read-target logical address from the host computer 100 (step S941). The memory controller 200 determines, from the received logical address, whether it indicates reading of the boot area or not (step S942). When it indicates reading of the boot area (step S942: Yes), the memory controller 200 refers to the address conversion table 260 to convert the logical address into a physical address of the high-speed nonvolatile memory 400 (step S943). Then, the data are read from the target physical address of the high-speed nonvolatile memory 400 (step S944). Then, the error detection correction processing based on the ECC with the data size of the boot area is performed on the data which have been read (step S945). At this occasion, when there is an error in the data which have been read, the data are corrected.

On the other hand, when the read command does not indicate the reading of the boot area (step S942: No), the memory controller 200 refers to the area management table 250 to determine whether it is the reading of the cache area or not (step S952). When the read command indicates the reading of the cache area (step S952: Yes), the memory controller 200 refers to the address conversion table 260 to convert the logical address into a physical address of the high-speed nonvolatile memory 400 (step S953). Then, the data are read from the target physical address of the high-speed nonvolatile memory 400 (step S954). Then, the error detection correction processing based on the ECC with the data size of the cache area is performed on the data which have been read (step S955). At this occasion, when there is an error in the data which have been read, the data are corrected.

When the read command indicates reading of neither the boot area nor the cache area (step S952: No), the memory controller 200 refers to the address conversion table 260 to convert the logical address into a physical address of the low-speed nonvolatile memory 300 (step S956). Then, the data are read from the target physical address of the low-speed nonvolatile memory 300 (step S957). Then, the error detection correction processing with the data size of the ECC defined in advance for the low-speed nonvolatile memory 300 is performed on the data which have been read (step S958). At this occasion, when there is an error in the data which have been read, the data are corrected.

When the data are read with such processing, the memory controller 200 transfers the data, which are read from the boot area or the cache area of the high-speed nonvolatile memory 400 or the low-speed nonvolatile memory 300, to the host computer 100 (step S959).

FIG. 15 is a flow diagram illustrating an example of processing procedure of moving processing performed by the memory controller 200 according to an embodiment of the present technique. The memory controller 200 moves the data stored in the cache area of the high-speed nonvolatile memory 400 to the low-speed nonvolatile memory 300 at a predetermined point in time. As described above, the point in time when the data are moved is considered to be, for example, a case where no access occurs from the host computer 100 for a certain period of time and a case where a certain amount of data which is more than a predetermined threshold value are accumulated in the cache area.

When it is time to move the data (step S961: Yes), the memory controller 200 selects a moving-target entry from among entries of the cache areas in the area management table 250 (step S962). Then, using the address conversion table 260 of the high-speed nonvolatile memory 400 and the low-speed nonvolatile memory 300, the logical addresses are respectively converted into physical addresses of the high-speed nonvolatile memory 400 and the low-speed nonvolatile memory 300 (step S963).

Subsequently, using the converted physical address, the data are read from the cache area of the high-speed nonvolatile memory 400, and the data are written to the low-speed nonvolatile memory 300, so that the data are moved (step S964). After the moving, the moved entry is deleted from the area management table 250 (step S965). Therefore, the data which have been read from the cache area are treated as not existing in the cache area.

When an entry in the area management table 250 of the memory system module 500 which is being moved is read, the moving operation is interrupted. Then, using the entry in the area management table 250, the reading processing is performed to read the cache area of the high-speed nonvolatile memory 400. After the reading processing is finished, the interrupted moving processing is resumed. After the moving processing is resumed, the moved entry is deleted.

When the logical address of the memory system module 500 which is being moved is written, the moving operation from the high-speed nonvolatile memory 400 to the low-speed nonvolatile memory 300 is interrupted. Then, using the entry in the area management table 250, the writing processing on the cache area of the high-speed nonvolatile memory 400 is performed. In this case, since the moving processing is interrupted, the entry is not deleted.

In this case, the moving processing from the cache area to the low-speed nonvolatile memory 300 has been explained. However, it is also possible to move the data from the low-speed nonvolatile memory 300 to the cache area. In this case, after the data are moved, an entry is added.

As described above, according to an embodiment of the present technique, the boot area for the boot information and the cache area for the low-speed nonvolatile memory 300 can be set in the high-speed nonvolatile memory 400. Therefore, the access speed to the low-speed nonvolatile memory 300 can also be improved in the cache area, and in addition, the boot information can be stored with a high degree of reliability in the boot area.

It should be noted that the above embodiment shows an example for carrying out the present technique, and the matters in the embodiments and the invention-identifying matters as described in claims have corresponding relationship with each other. Likewise, the invention-identifying matters as described in claims and the matters according to the embodiment of the present technique denoted with the same names as those in the claims have corresponding relationship with each other. However, the present technique is not limited to the embodiment, and the present technique can be embodied by applying various kinds of modifications to the embodiment without deviating from the gist of the present technique.

The processing procedure explained in the embodiment may be understood as a method having these series of procedures, and may be understood as a program for causing a computer to execute these series of procedures and a recording medium for storing the program. Examples of recording media including a CD (Compact Disc), an MD (MiniDisc), a DVD (Digital Versatile Disc), a memory card, a Blu-ray disk (Blu-ray (registered trademark) Disc), and the like.

It should be noted that the present technique may be configured as follows.

(1) A storage control device including:
an area defining unit configured to define, in a second memory, a system area for storing system information causing a system to operate and a cache area temporarily storing data of a first memory;
a moving processing unit configured to move data stored in the cache area to the first memory at a predetermined point in time; and
an access control unit configured to access the second memory in accordance with the definition with regard to access corresponding to the system area or the cache area, and read data from the first memory with regard to read-access corresponding to those other than the system area and the cache area.

(2) The storage control device according to (1), wherein the access control unit accesses the data in accordance with a data access size individually defined for each of the system area and the cache area.

(3) The storage control device according to (1) or (2), wherein a data access size of the system area is larger than a data access size of the cache area.

(4) The storage control device according to any of (1) to (3) further including an error detection correction processing unit performing error detection correction processing by giving an error correction code to a unit of data having a size defined individually for each of the system area and the cache area.

(5) The storage control device according to (4), wherein the data size of the giving unit of the error correction code for the system area is more than the data size of the giving unit of the error correction code for the cache area.

(6) The storage control device according to any of (1) to (5), wherein the access control unit configures such that a pulse width for writing to the system area is longer than that for the cache area.

(7) The storage control device according to any of (1) to (6), wherein the access control unit configures such that a voltage for writing to the system area is more than that for the cache area.

(8) The storage control device according to any of (1) to (7), wherein the access control unit configures such that a verification threshold value for writing to the system area is stricter than that for the cache area.

(9) The storage control device according to any of (1) to (8), wherein the access control unit configures such that a number of times verification is performed during writing to the cache area is less than that for the system area.

(10) A storage device including:
a first memory;
a second memory;
an area defining unit configured to define, in the second memory, a system area for storing system information causing a system to operate and a cache area temporarily storing data of the first memory;
a moving processing unit configured to move data stored in the cache area to the first memory at a predetermined point in time; and
an access control unit configured to access the second memory in accordance with the definition with regard to access corresponding to the system area or the cache area, and read data from the first memory with regard to read-access corresponding to those other than the system area and the cache area.

(11) the Storage Device According to (10), Wherein
the first and second memories are nonvolatile memories, and
a reading processing time of the second memory is less than a reading processing time of the first memory.

(12) An information processing system including:
a first memory;
a second memory;
an area defining unit configured to define, in the second memory, a system area for storing system information causing a system to operate and a cache area temporarily storing data of the first memory;
a moving processing unit configured to move data stored in the cache area to the first memory at a predetermined point in time;
an access control unit configured to access the second memory in accordance with the definition with regard to access corresponding to the system area or the cache area, and read data from the first memory with regard to read-access corresponding to those other than the system area and the cache area; and a host computer configured to issue an access request to the access control unit for access to the first or second memory.

(13) A storage control method including:
an area defining procedure for defining, in a second memory, a system area for storing system information causing a system to operate and a cache area temporarily storing data of a first memory;
a moving processing procedure for moving data stored in the cache area to the first memory at a predetermined point in time; and
an access control procedure for accessing the second memory in accordance with the definition with regard to access corresponding to the system area or the cache area, and read data from the first memory with regard to read-access corresponding to those other than the system area and the cache area.

REFERENCE SIGNS LIST

100 Host computer
200 Memory controller
201 Host interface control unit
203 Low-speed nonvolatile memory interface control unit
204 High-speed nonvolatile memory interface control unit
210 Processor
211 Access control unit
212 Moving processing unit
220 ROM
230 RAM
240 ECC processing unit
250 Area management table
251 Area defining unit
260 Address conversion table
300 Low-speed nonvolatile memory
400 High-speed nonvolatile memory
500 Memory system module

The invention claimed is:

1. A storage control device comprising:
an area defining unit configured to define, in a second memory, a system area for storing system information causing a system to operate and a cache area temporarily storing data of a first memory;
a moving processing unit configured to move data stored in the cache area to the first memory at a predetermined point in time; and
an access control unit configured to access the second memory in accordance with the definition with regard to access corresponding to the system area or the cache area, and read data from the first memory with regard to read-access corresponding to those other than the system area and the cache area.

2. The storage control device according to claim 1, wherein the access control unit accesses the data in accordance with a data access size individually defined for each of the system area and the cache area.

3. The storage control device according to claim 2, wherein a data access size of the system area is larger than a data access size of the cache area.

4. The storage control device according to claim 1 further comprising an error detection correction processing unit performing error detection correction processing by giving an error correction code to a unit of data having a size defined individually for each of the system area and the cache area.

5. The storage control device according to claim 4, wherein the data size of the giving unit of the error correction code for the system area is more than the data size of the giving unit of the error correction code for the cache area.

6. The storage control device according to claim 1, wherein the access control unit configures such that a pulse width for writing to the system area is longer than that for the cache area.

7. The storage control device according to claim 1, wherein the access control unit configures such that a voltage for writing to the system area is more than that for the cache area.

8. The storage control device according to claim 1, wherein the access control unit configures such that a verification threshold value for writing to the system area is stricter than that for the cache area.

9. The storage control device according to claim 1, wherein the access control unit configures such that a number of times verification is performed during writing to the cache area is less than that for the system area.

10. A storage device comprising:
a first memory;
a second memory;
an area defining unit configured to define, in the second memory, a system area for storing system information causing a system to operate and a cache area temporarily storing data of the first memory;
a moving processing unit configured to move data stored in the cache area to the first memory at a predetermined point in time; and
an access control unit configured to access the second memory in accordance with the definition with regard to access corresponding to the system area or the cache area, and read data from the first memory with regard to read-access corresponding to those other than the system area and the cache area.

11. The storage device according to claim 10, wherein the first and second memories are nonvolatile memories, and a reading processing time of the second memory is less than a reading processing time of the first memory.

12. An information processing system comprising:
a first memory;
a second memory;
an area defining unit configured to define, in the second memory, a system area for storing system information causing a system to operate and a cache area temporarily storing data of the first memory;
a moving processing unit configured to move data stored in the cache area to the first memory at a predetermined point in time;
an access control unit configured to access the second memory in accordance with the definition with regard to access corresponding to the system area or the cache area, and read data from the first memory with regard to read-access corresponding to those other than the system area and the cache area; and
a host computer configured to issue an access request to the access control unit for access to the first or second memory.

13. A storage control method comprising:
an area defining procedure for defining, in a second memory, a system area for storing system information causing a system to operate and a cache area temporarily storing data of a first memory;
a moving processing procedure for moving data stored in the cache area to the first memory at a predetermined point in time; and
an access control procedure for accessing the second memory in accordance with the definition with regard to access corresponding to the system area or the cache area, and read data from the first memory with regard to read-access corresponding to those other than the system area and the cache area.

* * * * *